Jan. 13, 1953 W. WOCKENFUSS 2,625,225
CARD PUNCH AND VERIFIER
Original Filed Jan. 31, 1950 6 Sheets-Sheet 1

Fig. 1

INVENTOR.
William Wockenfuss,
BY
Edward L. Mueller
ATTORNEY

Fig. 2

Jan. 13, 1953     W. WOCKENFUSS     2,625,225
CARD PUNCH AND VERIFIER Original Filed Jan. 31, 1950     6 Sheets-Sheet 3

INVENTOR.
*William Wockenfuss,*
BY
*Edward L. Mueller*
ATTORNEY

Fig. 5

Jan. 13, 1953     W. WOCKENFUSS     2,625,225
CARD PUNCH AND VERIFIER Original Filed Jan. 31, 1950     6 Sheets-Sheet 5

Fig. 6

INVENTOR.
William Wockenfuss,
BY
Edward L. Mueller
ATTORNEY

Patented Jan. 13, 1953

2,625,225

UNITED STATES PATENT OFFICE 2,625,225

CARD PUNCH AND VERIFIER

William Wockenfuss, Union, N. J., assignor, by mesne assignments, to Burroughs Adding Machine Company, a corporation of Michigan Original application January 31, 1950, Serial No. 141,428. Divided and this application October 24, 1950, Serial No. 191,757

7 Claims. (Cl. 164—113)

This invention relates to improvements in statistical card machines and has particular reference to a combined punch and verifier, this application being a division of the co-pending application of Clifford C. Leatherman and William Wockenfuss, Serial No. 141,428, filed January 31, 1950.

A feature of the invention is to provide an improved machine of practical construction wherein the operations of punching and verifying cards are accomplished by the alternate use of punch and verifying elements so arranged that each is under the control of the same instrumentalities.

Another and more specific feature is to coaxially dispose the punch and verifying elements one within the other in such manner as to enable the operation of the verifying element independently of the punch when verifying a record card.

The above and other features will appear more clearly from the following detailed description when taken in connection with the accompanying drawings which illustrate a preferred embodiment of the inventive idea; but it is to be expressly understood that said drawings are employed merely to facilitate the description of the invention as a whole and not to define the limits thereof, reference being had to the appended claims for this purpose.

Figure 1:
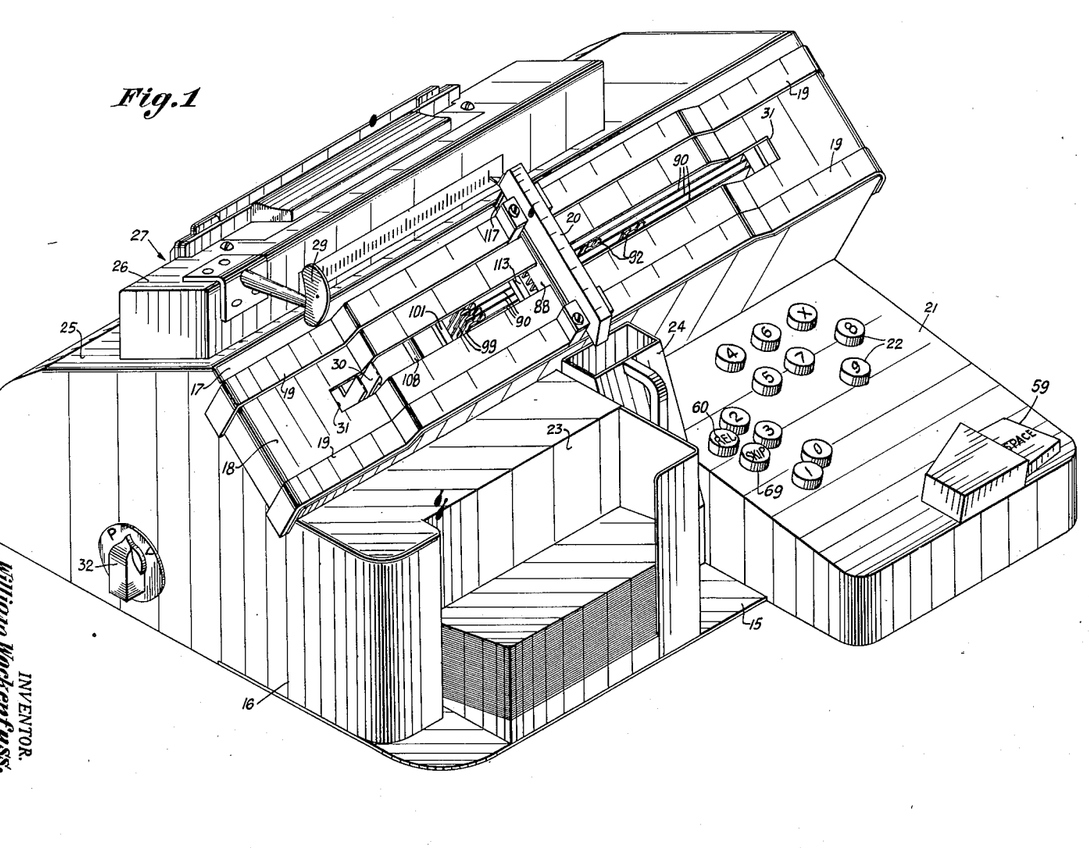
Fig. 1 is a perspective view of a combined punch and verifier constructed in accordance with the invention.

The preferred embodiment of the machine is shown, generally, in Fig. 1 as comprising a base 15 over which the main casing 16 is supported and provided with an intermediate forwardly and downwardly inclined section 17 upon which is mounted the plate 18 having longitudinal guide strips 19 between which a record card is disposed while being punched or verified. Said card, when in position, extends beneath a housing 20 arranged transversely of the plate 18 and located directly above a row of punches and verifying pins which are operated from beneath the card. This arrangement, including the inclination of the section 17, is such that the entire card, with the exception of that portion thereof directly beneath the housing 20, will be clearly visible to the operator during a punching or verifying operation. At the right of the base 15 there is suitably supported an inclined keyboard 21 having a plurality of keys 22 mounted thereon including the digital keys 0 to 9, a control hole key X, and the space, release and skip keys for controlling various operations in the machine. A record card supply magazine 23 is formed from part of the main casing 16 and between said magazine and the keyboard a space is provided for receiving a removable container 24 located directly beneath the lower end of the inclined housing 20 to receive chips which are punched from the cards. Above the rear top section 25 of the casing 16, a housing 26 encloses and is attached to a movable portion of an automatic skip mechanism, generally indicated at 27 and fully disclosed and claimed in the above mentioned parent application, and said movable portion is secured and actually forms part of the movable card carriage generally indicated at 28. Thus, by means of the finger piece 29 attached to the casing 26, the portion 27 of the skip mechanism and the card carriage may be moved longitudinally to the right from the position shown in Fig. 1 to the starting position wherein the punches and verifying pins under the housing 20 will be in line with the first column of a new record card inserted between the guides 19 and the abutments 30 extending forwardly from the card carriage (Fig. 2) and which project through a slot 31 formed in the plate 18 for engagement with the ends of the card to properly center and retain the same for punching and verifying operations as the carriage is moved along, step by step. A switch 32 mounted on one side of the casing 16 is utilized to cut in the electrical circuits of Fig. 12 when shifting control of the machine from punching to verifying operations, and vice versa.

Card carriage and its escapement

The card carriage 28 is composed of the upper and lower longitudinal rails 33 and 34 (see Fig. 5) connected by the transverse end pieces 35, and said rails carry the grooved rollers 36 which engage and roll along the upper and lower beveled edges of the stationary guide plate 37. The upper rail 33 has secured thereto the forwardly extending arms 38 (Fig. 2) which carry the card abutments 30 and which extend through and are movable in the longitudinal slots 39 formed in a rear plate 40 that supports the guide plate 37 and also cooperates with the parallel front plate 41 to support the punches and verifying pins to be hereinafter described.

Figure 6:
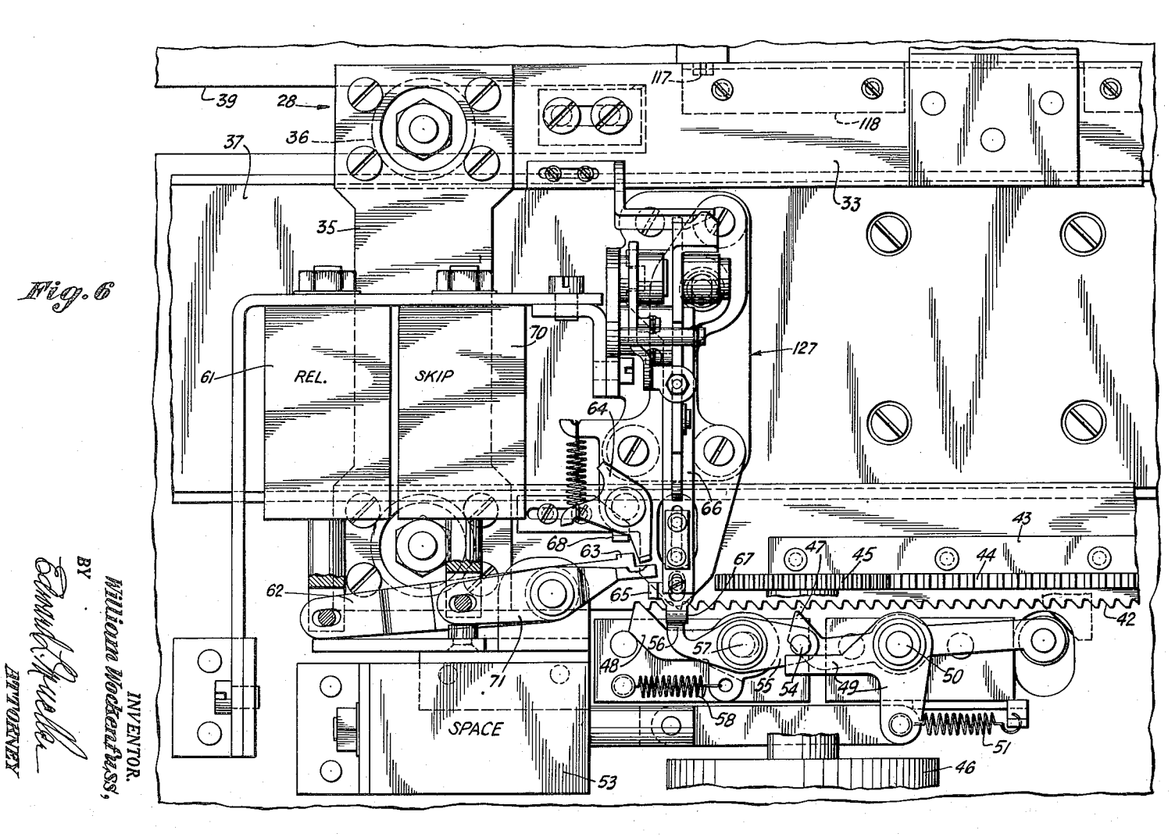
Fig. 6 is an enlarged fragmentary rear elevation of the machine showing the carriage escapement mechanism and control therefor, and with the carriage in the position of Fig. 2.

A portion of the bottom edge of the lower rail 34 is formed with the teeth 42 constituting a part of the carriage escapement, and to the rear face of said rail there is secured a plate 43 provided with a rack 44 engaged by a spur gear 45. Said gear driven from the spring motor, generally indicated at 46 (Fig. 3), to advance the carriage in accordance with the operation of the various keys of the keyboard, and the advance of the carriage is controlled by the escapement mechanism which includes the two pawls 47 and 48 (Fig. 6) that alternately engage with the teeth 42 to control such advance. The pawl 47 and the bell crank 49 to which it is fixedly connected are pivotally supported, intermediate their ends, on the stub shaft 50, and a spring 51 attached to one end of the bell crank normally maintains the latter and said pawl in the position shown in Fig. 6. However, when the pawl 47 is either actuated by the punch solenoid 52 (Fig. 3) or the bell crank 49 is rocked by the space solenoid 53 to which it is connected, said pawl will engage with one of the teeth 42. In either event, the rocking of the bell crank 49, one end of which engages a pin 54 on the arm 55, causes the latter to be rocked counterclockwise with the result that its bent end 56 resting on the upper edge of the pawl 48 turns said pawl about its pivot 57 to disengage it from the tooth with which it has been engaged while holding the carriage against advancement. Upon such disengagement, a spring 58 advances said pawl 48, which is loosely mounted on its pivot, a slight distance sufficient for it to engage the next succeeding tooth 42 when the pawl 47 is restored by the de-energization of the punch solenoid and consequent action of the spring 51, thus effecting a single step movement of the carriage.

When spacing, either during punching or verifying operations, the space solenoid 53 is controlled directly from the space key 59 (Figs. 1 and 7) and upon energization of said solenoid, it rocks the bell crank 49 and also the pawl 47 resulting, as previously described, in the advancement of the carriage one step.

A full release of the carriage is accomplished by the operation of release key 60 electrically connected directly to the release solenoid 61 which, when energized, rocks the lever 62 to depress its free end that has the shoulder 63 formed thereon. A spring-biased latch 64 then acts to engage over said shoulder so that said lever 62 will be held in a depressed position until the carriage is fully released. Operation of said lever causes its end adjacent said shoulder 63 to engage the extension 65 of an escapement control member in the form of the slide 66 and depress the latter. This slide is a part of the stationary portion 127 of the skip control mechanism fully described in said co-pending application, and its lowermost extremity is bent laterally to form a projection 67 that overlies and engages the bent end 56 of the pivoted arm 55 so that when the slide is depressed said arm will be rocked to disengage the pawl 48 from the teeth 42. Under control of the spring motor 46, the carriage now will move uninterruptedly to its full release position. Depression of the slide 66 has other functions in relation to the automatic skip mechanism 27 which need not be described herein. On reaching the full release position of the carriage, a release member 68 (Fig. 6) adjustably secured to said carriage contacts the pivoted latch 64 to disengage it from the shoulder 63, thus permitting lever 62 of the solenoid 61 to restore and also allowing the slide 66 to return to its normally raised position. It may be noted that the skip key 69 on the keyboard is also directly connected electrically to the skip solenoid 70 so that closure of said key will energize said solenoid to rock its arm 71, the free end of which will then engage the extension 65 of the slide 66 to thereby depress the latter. Again, the slide 66 will effect release of the pawl 48 so that the carriage will move freely toward its release position. However, in this skip operation, the carriage will advance only a predetermined distance under control of the skip mechanism 27.

The punches and verifying pins and operating mechanism therefor

Figure 5:
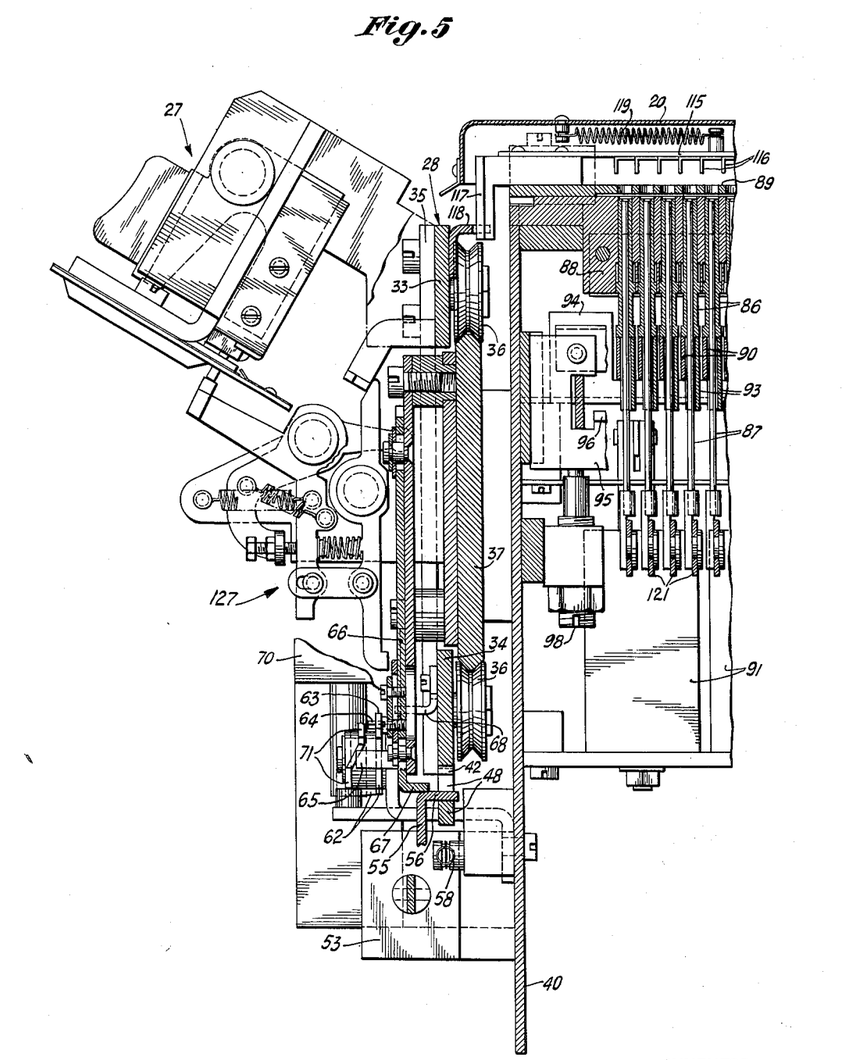
Fig. 5 is an enlarged fragmentary vertical transverse section substantially on the line 5—5 of Fig. 2, illustrating the card carriage in full release position.

The rear and front plates 40, 41 of the machine form a support for the punches 86 and verifying pins 87, the constructions of which are best shown in Fig. 5. A single row of these elements extends transversely between said plates 40, 41 which carry the guide block 88 for said elements. Said punches cooperate with a die plate 89 to perforate a card as it is advanced between said plate and the upper ends of the punches.

According to one of the features of the invention, each punch and its associated verifying pin are co-axially arranged with the pin extending through the punch and having independent or relative movement with respect to the latter during a verifying operation in which the punch remains in its normal or lower position and the pin is raised to either pass through a perforation in the record card being verified or engage the under surface of said card. When a perforation is sensed, the carriage escapement operates to advance the card to the next column to be verified, but if the card is engaged by the pin, the escapement fails to operate and the operator of the machine thereby becomes aware of an incorrect punching.

Each punch element and its verifying pin have associated therewith an actuator bar 90 (Figs. 3 and 4) which, in both punching and verifying operations, has an initial longitudinal movement imparted thereto by the energization of an individual solenoid 91 under control of one of the keys 22, said movement being effected by a bell crank 92 interconnecting the solenoid plunger with its bar. In a punching operation, this longitudinal movement of the bar 90 is employed to energize the punch solenoid 52, in a manner to later appear, which then controls mechanism to impart upward or secondary movement to said bar to transmit a similar motion to the punch 86 whose lower enlarged end rests upon the upper edge of said bar and that of a guide plate 93 secured to said bar and forming a guide for the verifying pin 87. When punching, the initial longitudinal movement of the bar 90 also results in the elevation of the pin 87 along with its punch but it is obvious that this operation of the pin has no effect since it will pass through the perforation in the record card formed by the punch. When verifying, the initial longitudinal movement of the bar 90 is the only actuation thereof that occurs since, in this instance, the punch solenoid 52 will not be energized, and the only result of said movement of the bar will be to elevate the verifying pin independently and relative to its punch to sense whether or not a perforation has been made in the card being verified at the index point corresponding to the operated key 22.

Figure 2:
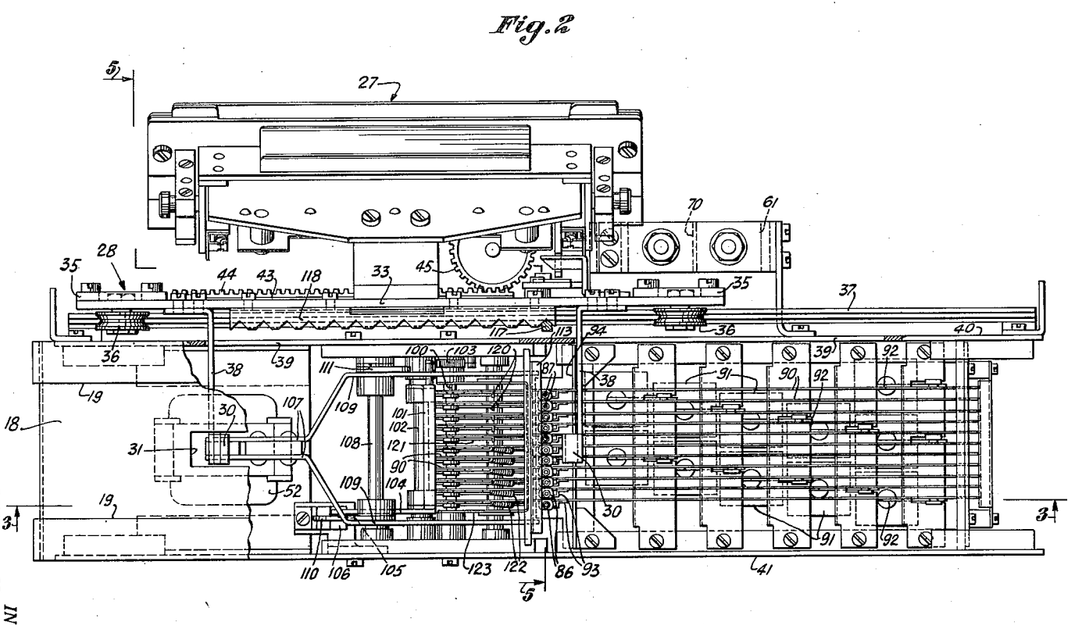
Fig. 2 is a top plan view with the cover of the machine broken away to show the interior construction and illustrating the card carriage in its extreme left end position from which it is returnable to the starting position thereof.
Figures 3, 4:
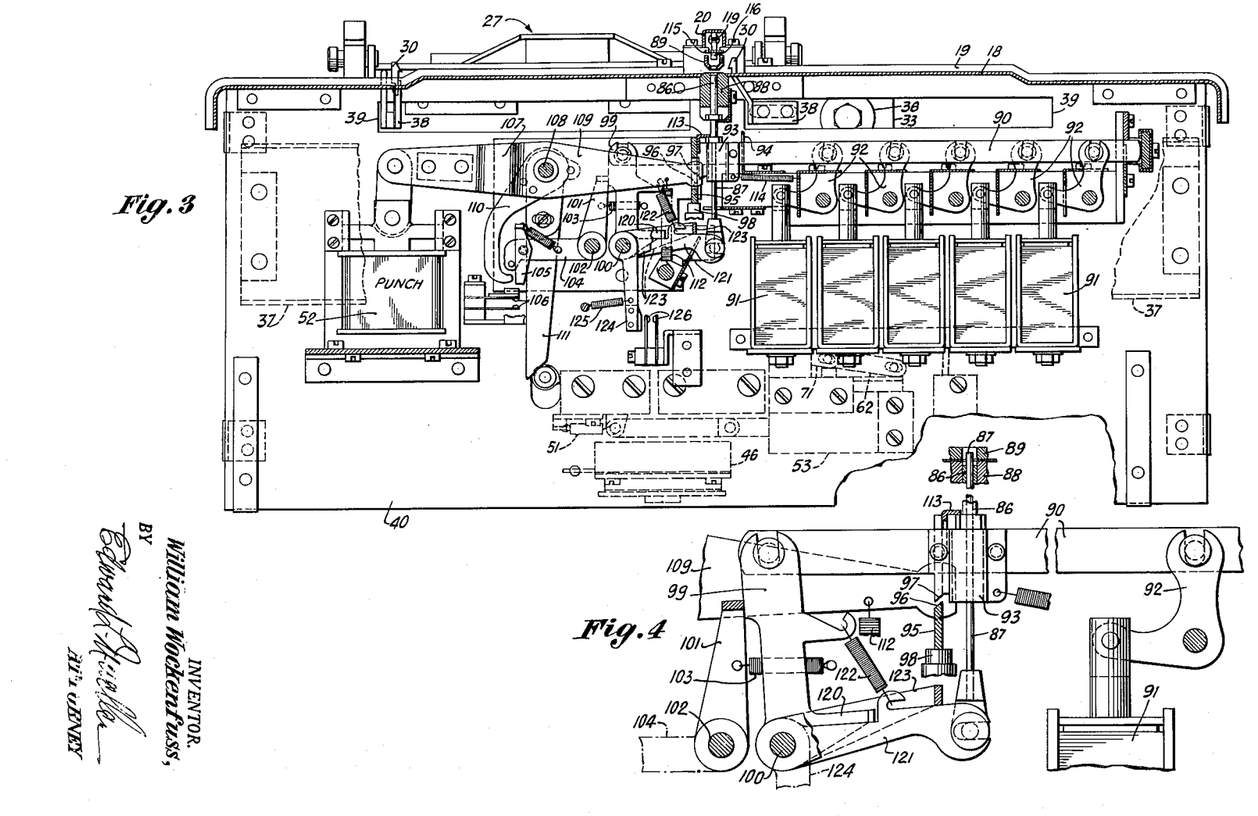
Fig. 3 is a fragmentary longitudinal section taken substantially on the line 3—3 of Fig. 2.
Fig. 4 is an enlarged sectional view of a part of a mechanism shown in Fig. 3 and illustrating the operative position of one of the key operated actuators and some of its associated parts.

Returning to the punched operation and by particular reference to Figs. 2, 3 and 4, it will be seen that the actuator bars 90 all extend through a comb 94 located just to the right of the guide plates 93 on said bars. The latter then project through a vertically guided bail plate 95 common to the bars 90 and cut out to receive the same, an edge of said plate being beveled at 96 to cooperate with the beveled edge of a shoulder 97 on each of said guide plates 93 when said bail plate is raised to elevate a punch. Said beveled edges also cooperate, when engaged, to prevent return of an actuator bar 90 upon de-energization of its solenoid 91. In the normal position of Fig. 3, the beveled shoulders 97 on all the guide plates 93 are out of vertical alignment with the edge 96 of said bail plate so that any vertical movement of the latter will have no effect upon a bar 90 and its associated punch 86, but when any one of the bars is advanced longitudinally, to the position of Figure 4, by the energization of its solenoid 91 the two mentioned beveled edges will be brought into alignment preparatory to the secondary or upward movement of said bar under the influence of the punch solenoid 52. The amount of movement of the bail plate 95, and consequently of the punches 86, may be regulated by an adjustment of the set screws 98 which engage the lower edge of said plate adjacent its ends, there being only one of such set screws shown in the drawings.

With the switch 32 (Figs. 1 and 7) in the punching position, when one of the keys 22 is struck its associated bar 90 is initially moved longitudinally to the left, as viewed in Fig. 3, to turn the arm 99 loosely mounted on the rock shaft 100 to the position of Fig. 4. In connection with a verifying operation, this action of the arm 99 results in the elevation of the verifying pin along with its punch, as previously mentioned and more fully described hereinafter. When the arm 99 is rocked, it actuates the common bail 101 on the shaft 102 by contact with the cross piece of said bail and against the tension of its return spring 103. The arm 104 of said bail 101 pivotally carries a spring-biased contact operating member 105 which, when the bail 101 is rocked, closes the punch contacts 106 to establish the operating circuit (Fig. 7) for the punch solenoid 52 which then energizes. Connected to the core of said solenoid is an operating arm 107 secured to the rock shaft 108 and having two branches 109 (see Fig. 2) the extremities of which engage in openings formed in the bail plate 95. When the bar 90 has been fully actuated, shoulder 97 of the guide 93 on said bar is aligned with the beveled edge 96 of the bail plate so that when the arm 107 and shaft 108 are rocked to raise said bail plate it will impart the secondary or upward movement to the bar 90. With the lower end of the punch 86 resting upon the bar and its guide plate 93, as best shown in Fig. 5, the punch will be elevated to form a perforation in the record card. The closure of the contacts 106 for energizing the punch solenoid is only of sufficient duration to permit the solenoid 52 to operate the bail plate 95, whereupon the rocking of the shaft 108 causes a trip arm 110 carried thereby to contact the member 105 and disengage it from the contacts 106 to break the circuit for the punch solenoid. Rocking of the shaft 108 also swings the long arm 111 secured to and depending therefrom so as to cause its lower extremity contacting the adjacent end of the pawl 47 of the escapement mechanism to rock said pawl to engage it with a tooth 42 and thereby initiate the operation of said escapement which results in the advancement of the card carriage, as previously described. After the record card has been perforated by the operated punch 86 and with the solenoid 52 de-energized, the operating arm 107 is restored to normal position by the springs 112 connected to the branches 109 of said arm, only one of said springs being shown in Fig. 3. The return of the arm 107 to normal also restores the bail plate 95 and the arm 111. The bail 95 carries a flange 113 engageable with the enlarged lower ends of all of the punches 86 so as to return any operated punch to its normal position. Since the energized key solenoid 91 is now de-energized by release of the key 22 which has been struck, the associated bar 90 is returned to normal by its individual spring 114 connected to the guide plate 93 of said bar, and the arm 99 is also restored. This latter restoration permits the spring 103 to return the bail 101 to normal and the punching operation is thus completed.

With the punches 86 operating upwardly through the record cards, provision is made for discharging the chips out of said cards from the upper surface of the punch die 89 (Fig. 5). To accomplish this purpose, the housing 20 encloses a reciprocatory agitator 115 having longitudinally spaced blades 116 depending therefrom into proximity with said punch die to agitate and cause the chips above the latter to move downwardly toward the discharge end of the housing 20 where they will be deposited into the receptacle 24. To operate the agitator 115, the same is provided with a depending arm 117 engaged with the teeth of a rack 118 (Fig. 1) secured to the upper rail 33 of the card carriage so that as the latter moves said rack will force the agitator to the right, whereupon it is returned by the coil spring 119 one end of which is fixed to the housing 20 and the other end to said agitator. This operation of discharging the chips is particularly effective when the card carriage is moved uninterruptedly to its full release position during which the agitator is continuously reciprocated, or when said carriage is returned to its starting position after completion of the punching of a card.

Figure 7:
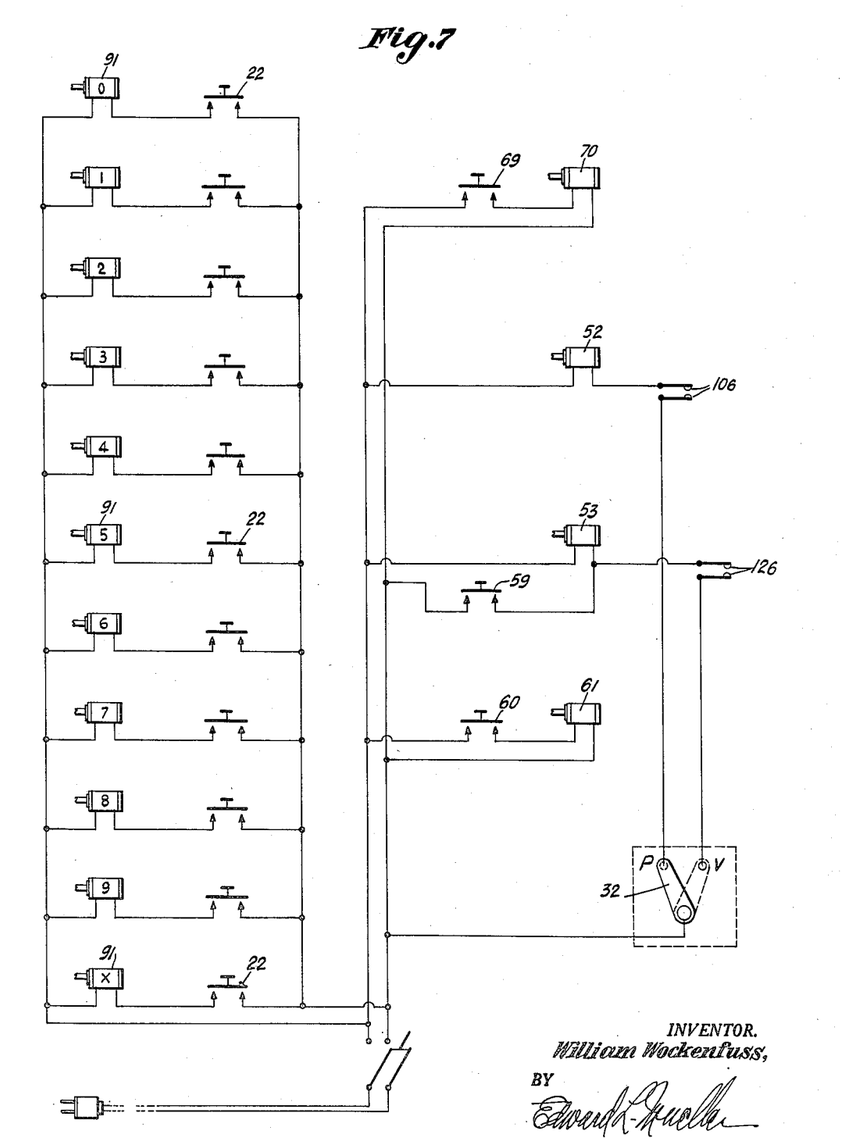
Fig. 7 is a diagrammatic view of the control circuits of the machine.

When verifying a record card which has been punched, the switch 32 is moved to the dotted line position of Fig. 7, thus disconnecting the punch solenoid 52 from the operating circuit. Striking of one of the keys 22 operates the associated actuator bar 90 with the same result as previously described except that closure of the punch contacts 106 has no effect because of the position of the switch 32 and therefore the punch solenoid will not be energized, and with the further result that the bar 90 has only its initial longitudinal movement imparted thereto. Operation of the arm 99 by its bar 90 swings an extension 120 (Fig. 4) of said arm upwardly to free another arm 121 pivoted on the shaft 100 for upward movement and this latter movement is accomplished by a spring 122 connecting said arm 121 with the arm 99. Said arm 121 is connected to the lower end of the verifying pin 87 which is now raised independently of its associated punch to sense for a perforation in the card being verified. If there is a perforation in the card, the upper end of the pin will pass therethrough and the parts will assume the position of Fig. 4 in which the arm 121 will have elevated a restoring bail 123 common to all said arms. Said bail is secured to the shaft 100 and, by being elevated, will rock the shaft and thus produce a swinging movement of the depending arm 124 also secured to said shaft and this movement, which is against the action of the return spring 125, will be sufficient to close the space contacts 126 for the space solenoid 53 which then energizes. Solenoid 53 now operates the bell crank 49 to initiate the operation of the escapement mechanism as previously described. Should the verifying pin contact a record card instead of passing through a perforation therein, the upward movement of said pin will be stopped, as will be the similar movement of the arm 121 and the restoring bail 123 and, therefore, the swinging movement of the arm 124 will be insufficient to close the space contacts 126 with the result that the escapement mechanism will not be operated to advance the card carriage. Continued movement of the arm 99 after the pin 87 engages a card, will then be against the tension of the spring 122 and the extension 120 of said arm will disengage itself from the arm 121. At the conclusion of the upstroke of the verifying pin, either in the event that it passes through a perforation or contacts a card, the actuator bar 90 restores so as to return the arm 99 to its normal position and re-engage the extension 120 with the arm 121. At the same time, the spring 125 connected to the arm 124 then restores the latter to normal and, in so doing, rocks the shaft 100 to depress the bail 123 to return the arm 121 to its lower position and thereby similarly restore the verifying pin.

What is claimed is:

1. In a combined punch and verifier, a punch element and a verifying pin co-axially arranged one within the other and with said pin having movement relative to said punch element when verifying a card, means for operating said punch element and pin including a common actuator upon which said element is supported and having means to guide said pin, said actuator having primary and secondary movements when punching a card and only a primary movement when verifying said card and said secondary movement being under control of said operating means, means to effect the primary movement of said actuator, means to disconnect said operating means from said punch element, and means then responsive to the primary movement of said actuator to operate said verifying pin relative to said punch element.

2. In a combined punch and verifier, a card carriage, an escapement therefor, a punch element and a verifying pin with respect to which said carriage is movable under control of said escapement, said element and pin being co-axially arranged with said pin having movement relative to said punch element when verifying a card, a circuit including punch and space solenoids and a set of contacts for each, means to alternatively connect said sets of contacts to said circuit, a common actuator for both punching and verifying operations, means controlled by said actuator and, in turn, controlling the same to operate said punch element through said punch solenoid when its contacts are in circuit and closed by the last named means, means actuated by said punch solenoid for operating said escapement, means controlled by said actuator for moving said verifying pin relative to said punch element when said space solenoid and its contacts are in circuit, and means actuated by said space solenoid for operating said escapement only when said verifying pin passes through a perforation in said card.

3. In a combined punch and verifier, a plurality of punch elements each assigned to a single index point position of the various columns of a record card, operating mechanism for said punch elements including an actuator for each element having primary and secondary movements and upon which said element is directly supported for operation by said actuator during its secondary movement, a bail member common to and having connection with said actuators for secondarily moving the same to operate said punch elements, a guide member on each actuator and having means brought into operative association with said bail member by the primary movement of said actuator, means controlled by said actuator as a result of its primary movement for operating said bail member to effect the secondary movement of said actuator, a verifying pin slidable in each of said guide members for independent movement relative to said punch elements and through a perforation in a card when verifying the same, means to disable the operating means for said bail member during card verification, and means controlled by the primary movement of an actuator for operating its associated verifying pin when said operating means is disabled.

4. In a combined punch and verifier, a plurality of punch elements each assigned to a single index point position of the various columns of a record card, operating mechanism for said punch elements including an actuator for each element having primary and secondary movements and upon which said element is directly supported for operation by said actuator during its secondary movement, a bail member common to and having connection with said actuators for secondarily moving the same to operate said punch elements, a guide member on each actuator and having means brought into operative association with said bail member by the primary movement of said actuator, means controlled by said actuator as a result of its primary movement for operating said bail member to effect the secondary movement of said actuator, a verifying pin slidable in each of said guide members and arranged co-axially with and extending through one of said punch elements for independent movement relative thereto and through a perforation in a card being verified, means to disable the operating means for said bail member during card verification, and means controlled by the primary movement of an actuator for operating its associated verifying pin when said operating means is disabled.

5. In a combined punch and verifier for record cards, a plurality of punch elements, a verifying pin for each element co-axially arranged therein and having movement relative thereto when operated to verify a perforation previously formed in a card by its associated punch element, an actuator for each punch element having primary and secondary movements, means to primarily move each actuator, a common bail for said actuators normally disconnected therefrom and operable upon connection thereto to impart said secondary movement, means to operatively connect said bail to said actuator upon primary movement thereof, means including an electromagnetic device for operating said bail member, a circuit for said device, means operable by said actuator under control of its primary movement to close said circuit and thereby energize said electromagnetic device to operate said bail member, means to disable said circuit, and means actuated under control of the primary movement of said actuator, when said circuit is disabled, for operating said verifying pin relative to its punch element.

6. In a combined punch and verifier, a punch element, a verifying pin co-axially arranged relative to said punch element and having movement with respect thereto when verifying a card, an actuator for said pin and punch element upon which the latter is directly supported and having primary and secondary movements when punching a card and only a primary movement when verifying said card, means to impart the secondary movement to said actuator to operate said punch, means to disable the last named means, and means controlled only by the primary movement of said actuator, when the first named means is disabled, for operating said verifying pin relative to said punch element.

7. In a combined punch and verifier, a card carriage, an escapement therefor, a punch element and a verifying pin with respect to which said carriage is movable under control of said escapement, said punch element and pin being ararnged one within the other with said pin having movement relative to said punch element when verifying a card, a circuit, punch and space solenoids adapted for alternative connection to said circuit, means to so connect said solenoids to said circuit, means controlled by said punch solenoid when connected in said circuit for operating said punch element, means controlled by the last named means, when said space solenoid is in circuit, for operating said verifying pin relative to said punch element, and means actuated by said space solenoid for operating said escapement only when said verifying pin passes through a perforation in a card.

WILLIAM WOCKENFUSS.

REFERENCES CITED

The following references are of record in the file of this patent:

UNITED STATES PATENTS

| Number | Name | Date |
|---|---|---|
| 1,397,007 | Knistrom | Nov. 15, 1921 |
| 1,803,979 | Schaaff | May 5, 1931 |
| 2,046,082 | Mills | June 30, 1936 |
| 2,168,434 | Von Pein | Aug. 8, 1939 |
| 2,292,635 | Heath | Aug. 11, 1942 |
| 2,307,617 | Braun | Jan. 5, 1943 |
| 2,394,604 | Ford | Feb. 12, 1946 |